United States Patent
Kim et al.

(10) Patent No.: US 11,996,518 B2
(45) Date of Patent: May 28, 2024

(54) SOLID ELECTROLYTE MEMBRANE, METHOD FOR MANUFACTURING THE SAME AND ALL-SOLID-STATE BATTERY COMPRISING THE SAME

(71) Applicant: LG CHEM, LTD., Seoul (KR)

(72) Inventors: Eun-Bee Kim, Daejeon (KR); Jung-Pil Lee, Daejeon (KR); Ji-Hoon Ryu, Daejeon (KR); Suk-Woo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 753 days.

(21) Appl. No.: 17/264,604

(22) PCT Filed: Dec. 19, 2019

(86) PCT No.: PCT/KR2019/018146
§ 371 (c)(1),
(2) Date: Jan. 29, 2021

(87) PCT Pub. No.: WO2020/130695
PCT Pub. Date: Jun. 25, 2020

(65) Prior Publication Data
US 2021/0336294 A1 Oct. 28, 2021

(30) Foreign Application Priority Data
Dec. 21, 2018 (KR) .................. 10-2018-0167832

(51) Int. Cl.
*H01M 10/0565* (2010.01)
*B32B 5/02* (2006.01)
(Continued)

(52) U.S. Cl.
CPC ......... *H01M 10/0565* (2013.01); *B32B 5/022* (2013.01); *B32B 27/12* (2013.01);
(Continued)

(58) Field of Classification Search
CPC .......... H01M 10/0565; H01M 10/052; H01M 2300/0082; H01M 2300/0094;
(Continued)

(56) References Cited

U.S. PATENT DOCUMENTS

2009/0311589 A1 12/2009 Kim et al.
2011/0068001 A1* 3/2011 Affinito .................. H01M 4/134
156/247
(Continued)

FOREIGN PATENT DOCUMENTS

| CN | 108598570 A | 9/2018 |
|---|---|---|
| EP | 3 787 092 A1 | 3/2021 |

(Continued)

OTHER PUBLICATIONS

JP2004160764. English machine translation by EPO. Jun. 10, 2004. (Year: 2001).*
International Search Report for PCT/KR2019/018146 mailed on Apr. 3, 2020.
European Search Report for Appl. No. 19901238.6 dated Nov. 8, 2021.

*Primary Examiner* — James Lee
(74) *Attorney, Agent, or Firm* — Birch, Stewart, Kolasch & Birch, LLP

(57) ABSTRACT

The present disclosure relates to an electrolyte membrane for an all-solid-state battery, an all-solid-state battery comprising the electrolyte membrane and a method for manufacturing the solid electrolyte membrane. The solid electrolyte membrane may be obtained by stacking a first protective layer, a first film-type solid electrolyte material, a porous substrate, a second film-type solid electrolyte material and a second protective layer successively to prepare a laminate structure; and carrying out pressurization of the laminate structure so that the first and the second solid electrolyte materials may be pressed into the porous substrate and the pores of the porous substrate may be filled with the solid electrolyte materials.

11 Claims, 8 Drawing Sheets

(51) Int. Cl.
*B32B 27/12* (2006.01)
*B32B 27/28* (2006.01)
*B32B 37/06* (2006.01)
*B32B 37/10* (2006.01)
*B32B 37/18* (2006.01)
*H01M 10/052* (2010.01)

(52) U.S. Cl.
CPC ............ *B32B 27/285* (2013.01); *B32B 37/06* (2013.01); *B32B 37/10* (2013.01); *B32B 37/185* (2013.01); *B32B 2260/023* (2013.01); *B32B 2260/046* (2013.01); *B32B 2262/0284* (2013.01); *B32B 2305/026* (2013.01); *B32B 2367/00* (2013.01); *B32B 2371/00* (2013.01); *B32B 2457/10* (2013.01); *H01M 10/052* (2013.01); *H01M 2300/0082* (2013.01); *H01M 2300/0094* (2013.01)

(58) Field of Classification Search
CPC ....... B32B 5/022; B32B 27/12; B32B 27/285; B32B 37/06; B32B 37/10; B32B 37/185; B32B 2260/023; B32B 2260/046; B32B 2262/0284; B32B 2305/026; B32B 2367/00; B32B 2371/00; B32B 2457/10
See application file for complete search history.

(56) References Cited

U.S. PATENT DOCUMENTS

| | | |
|---|---|---|
| 2013/0236766 A1 | 9/2013 | Seo et al. |
| 2015/0333310 A1 | 11/2015 | Choi et al. |
| 2017/0331156 A1 | 11/2017 | Visco et al. |

FOREIGN PATENT DOCUMENTS

| | | |
|---|---|---|
| JP | 6-134931 A | 5/1994 |
| JP | 10-172614 A | 6/1998 |
| JP | 2004-160764 A | 6/2004 |
| JP | 2007-157571 A | 6/2007 |
| JP | 2008-277288 A | 11/2008 |
| JP | 2009-535764 A | 10/2009 |
| JP | 2014-96311 A | 5/2014 |
| JP | 2017-103146 A | 6/2017 |
| JP | 2018-113140 A | 7/2018 |
| KR | 10-2001-0055968 A | 7/2001 |
| KR | 10-1246825 B1 | 3/2013 |
| KR | 10-2014-0081414 A | 7/2014 |
| KR | 10-1747935 B1 | 6/2017 |
| KR | 10-2018-0006815 A | 1/2018 |
| KR | 10-2018-0015843 A | 2/2018 |

\* cited by examiner

SOLID ELECTROLYTE MEMBRANE, METHOD FOR MANUFACTURING THE SAME AND ALL-SOLID-STATE BATTERY COMPRISING THE SAME

TECHNICAL FIELD

The present application claims priority to Korean Patent Application No. 10-2018-0167832 filed on Dec. 21, 2018 in the Republic of Korea. The present disclosure relates to an electrolyte membrane for an all-solid-state battery, an all-solid-state battery comprising the electrolyte membrane, and a method for manufacturing the electrolyte membrane.

BACKGROUND ART

A lithium ion battery using a liquid electrolyte has a structure in which a negative electrode and positive electrode are defined by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte solution to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

In general, as a solid electrolyte, a polymeric solid electrolyte, oxide-based solid electrolyte and sulfide-based solid electrolyte have been used. Among those, a polymeric solid electrolyte has advantages, comprising low cost, flexibility of the material, easy processability, safety of a battery and improved energy density derived from thin filming of an electrolyte layer and battery.

However, such a polymeric solid electrolyte material has low strength. Thus, when forming a thin film with a thickness of several tens of microns from the polymeric solid electrolyte material, tearing may occur during the manufacture of an electrolyte membrane or battery. In addition, when applying the polymeric solid electrolyte material as an electrolyte membrane material for a lithium metal battery, the electrolyte membrane may be damaged by lithium dendrite formed from a negative electrode to cause a failure in insulation between the negative electrode and positive electrode. Thus, there is a need for developing a solid electrolyte membrane using a novel composition of polymeric solid electrolyte and an all-solid-state battery using the same in order to realize excellent electrochemical characteristics of an all-solid-state battery.

DISCLOSURE

Technical Problem

The present disclosure is designed to solve the problems of the related art, and therefore the present disclosure is directed to providing a polymeric solid electrolyte membrane for an all-solid-state battery which uses a solid electrolyte material and has a small thickness and excellent strength, and an all-solid-state battery comprising the solid electrolyte membrane. The present disclosure is also directed to providing a method for manufacturing the above-mentioned solid electrolyte membrane and a method for manufacturing an all-solid-state battery comprising the solid electrolyte membrane. Meanwhile, these and other objects and advantages of the present disclosure may be understood from the following detailed description. Also, it will be easily understood that the objects and advantages of the present disclosure may be realized by the means shown in the appended claims and combinations thereof.

Technical Solution

According to the first embodiment of the present disclosure, there is provided a method for manufacturing a solid electrolyte membrane for an all-solid-state battery, comprising the steps of: stacking a first protective layer, a first film-type solid electrolyte material, a porous substrate, a second film-type solid electrolyte material and a second protective layer successively to prepare a laminate structure; carrying out pressurization of the laminate structure so that the first and the second solid electrolyte materials may be pressed into the porous substrate and the pores of the porous substrate may be filled with the solid electrolyte materials; and removing the first protective layer and the second protective layer, wherein the pressurization is carried out by a roll-press process.

According to the second embodiment of the present disclosure, there is provided the method for manufacturing a solid electrolyte membrane for an all-solid-state battery as defined in the first embodiment, wherein a release film is further disposed on each of both surfaces of the laminate structure before the pressurization, and the first protective layer, the second protective layer and the release film are removed after the pressurization.

According to the third embodiment of the present disclosure, there is provided the method for manufacturing a solid electrolyte membrane for an all-solid-state battery as defined in the first or the second embodiment, wherein the film-type solid electrolyte material is a mixture of a polymer resin with a lithium salt and shows an ion conductivity of $1 \times 10^{-7}$ S/cm or more.

According to the fourth embodiment of the present disclosure, there is provided the method for manufacturing a solid electrolyte membrane for an all-solid-state battery as defined in any one of the first to the third embodiments, wherein the first protective layer and the second protective layer are the same as the porous substrate.

According to the fifth embodiment of the present disclosure, there is provided the method for manufacturing a solid electrolyte membrane for an all-solid-state battery as defined in any one of the first to the fourth embodiments, wherein the first protective layer and the second protective layer are obtained by using the same materials as the porous substrate in terms of ingredients and contents under the same processing conditions.

According to the sixth embodiment of the present disclosure, there is provided the method for manufacturing a solid electrolyte membrane for an all-solid-state battery as defined in any one of the first to fifth embodiment, wherein the porous substrate, the first protective layer and the second protective layer have the same contact angle.

According to the seventh embodiment of the present disclosure, there is provided the method for manufacturing a solid electrolyte membrane for an all-solid-state battery as defined in any one of the first to the sixth embodiments, wherein the porous substrate is a polymer film or nonwoven web having a plurality of pores.

According to the eighth embodiment of the present disclosure, there is provided the method for manufacturing a solid electrolyte membrane for an all-solid-state battery as defined in the third embodiment, wherein the polymer resin is any one selected from the group consisting of a polyether polymer, polycarbonate polymer, acrylate polymer, polysiloxane polymer, phosphazene polymer, polyethylene derivative, alkylene oxide derivative, such as polyethylene oxide, phosphate polymer, polyagitation lysine, polyester sulfide, polyvinyl alcohol and polyvinylidene fluoride, or a mixture of two or more of them.

According to the ninth embodiment of the present disclosure, there is provided the method for manufacturing a solid electrolyte membrane for an all-solid-state battery as defined in any one of the first to the eighth embodiments, wherein the first solid electrolyte material and the second solid electrolyte material are prepared by using the same materials under the same processing conditions.

According to the tenth embodiment of the present disclosure, there is provided the method for manufacturing a solid electrolyte membrane for an all-solid-state battery as defined in any one of the first to the ninth embodiments, wherein the first film-type solid electrolyte material and the second film-type solid electrolyte material have the same thickness.

According to the eleventh embodiment of the present disclosure, there is provided the method for manufacturing a solid electrolyte membrane for an all-solid-state battery as defined in any one of the first to the tenth embodiments, wherein the solid electrolyte materials are pressed into the porous substrate by carrying out pressurization of the laminate structure, and the pressurization is carried out by using a roll press.

According to the twelfth embodiment of the present disclosure, there is provided the method for manufacturing a solid electrolyte membrane for an all-solid-state battery as defined in any one of the first to the eleventh embodiments, wherein at least one of the first solid electrolyte material and the second solid electrolyte material is prepared by disposing it locally at a specific portion of the porous substrate surface before the pressurization.

According to the thirteenth embodiment of the present disclosure, there is provided the method for manufacturing a solid electrolyte membrane for an all-solid-state battery as defined in any one of the first to the twelfth embodiments, wherein the pressurization is carried out under heating.

Advantageous Effects

The solid electrolyte membrane according to the present disclosure can reduce the manufacturing cost by using a polymeric solid electrolyte, and allows easy deformation so that it may be applied to various types of batteries. In addition, the solid electrolyte membrane according to the present disclosure comprises a composite of a porous polymer material, such as a nonwoven web, with a solid electrolyte material, and thus can be formed into a thin film having a thickness of 70 μm or less, while providing high strength. Therefore, the solid electrolyte membrane according to the present disclosure is advantageous to improvement of the energy density of a battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1A:
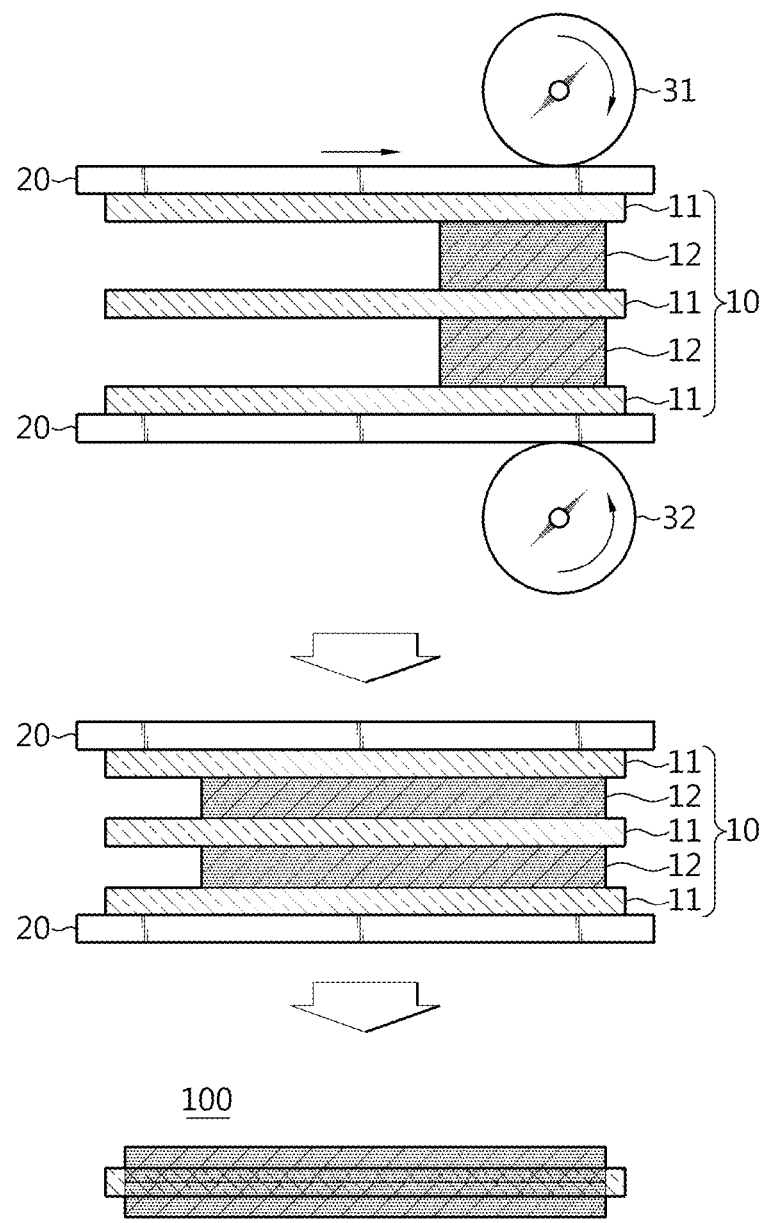
FIG. 1a and FIG. 1b are schematic flow charts illustrating the method for manufacturing a solid electrolyte membrane according to the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part⌈ comprise(s)⌋ an element' does not preclude the presence of any additional elements but means that the part may further comprise the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure comprising an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'upper', 'lower', 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms comprise the above-listed words, derivatives thereof and words having similar meanings.

The present disclosure relates to a solid electrolyte membrane for an all-solid-state battery and an all-solid-state battery comprising the same. The present disclosure also relates to a method for manufacturing the electrolyte membrane. The solid electrolyte membrane for an all-solid-state battery according to the present disclosure can be formed into a thin film having a thickness of about 70 μm or less, and thus has high ion conductivity and can provide a battery with increased energy density. In addition, the solid electrolyte membrane has high strength despite such a small thickness, and thus is less damaged during its manufacture or during use of a battery.

Figure 1B:
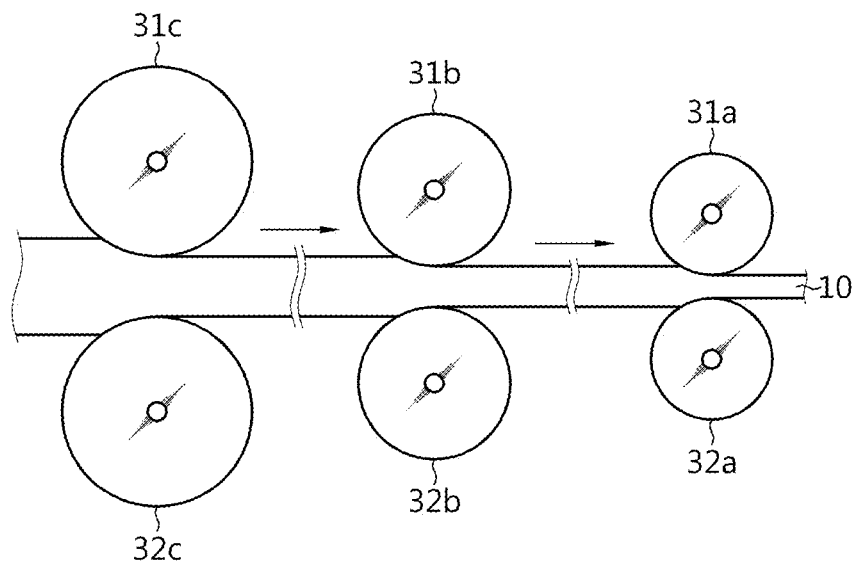

FIG. 1a and FIG. 1b are schematic views illustrating the solid electrolyte membrane according to an embodiment of the present disclosure, and a method for manufacturing the solid electrolyte membrane. Hereinafter, the present disclosure will be described in detail with reference to the accompanying drawings.

Electrolyte Membrane for all-Solid-State Battery

FIG. 1a is a schematic sectional view illustrating the electrolyte membrane 100 according to an embodiment of the present disclosure. The electrolyte membrane according to the present disclosure comprises a first electrolyte layer, a second electrolyte layer and a substrate layer interposed between the first and the second electrolyte layers. The substrate layer comprises a porous substrate which forms a composite with a solid electrolyte material packed in the pores of the porous substrate. As described hereinafter, the electrolyte membrane is formed by stacking the first electrolyte layer and the second electrolyte layer on the top surface and the bottom surface of the porous substrate, and carrying out pressurization so that a portion of thickness of the electrolyte layers may be pressed into the porous substrate and the pores of the porous substrate may be filled with the electrolyte layers. Thus, at least a part of the pores inside of the porous substrate is filled with the electrolyte layers and a portion of thickness of the first electrolyte layer and the second electrolyte layer is retained outside of the substrate. According to an embodiment of the present disclosure, the electrolyte layer(s) may be totally pressed into the substrate layer of the electrolyte membrane, while the first electrolyte layer and the second electrolyte layer are not retained outside of the substrate layer (i.e. no electrolyte layer(s) remains on the substrate layer surface), depending on material characteristics and processing conditions, such as pressurization degree, thickness of the porous substrate, porosity of the porous substrate, thickness of the first electrolyte layer and that of the second electrolyte layer.

The porous substrate is a porous ion-conducting barrier which interrupts electrical contact between a negative electrode and a positive electrode, while allowing passage of ions, and may be a polymer sheet comprising a plurality of pores. The pores are interconnected so that a gas or liquid may pass from one surface of the substrate to the other surface of the substrate.

According to an embodiment of the present disclosure, the porous substrate comprises a polymer material, which may comprise at least one selected from polymer resins, such as polyolefin, polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalate. The porous substrate may be a nonwoven web formed by compressing polymer filaments or a porous polymer film formed by melting and orienting a polymer material.

Particularly, the porous polymer substrate may be any one porous film selected from the following a) to e):

a) a porous film formed by melting/extruding a polymer resin,
b) a multi-layer film formed by stacking two or more layers of the porous films as defined in a),
c) a non-woven web produced by integrating filaments obtained by melting/spinning a polymer resin,
d) a multi-layer film formed by stacking two or more layers of the non-woven webs as defined in c), and
e) a multi-layer porous composite film comprising two or more of a)-d).

According to the present disclosure, the porous substrate may have a thickness of 10-100 μm. Preferably, the porous substrate may have a thickness of 50 μm or less, or 30 μm or less, in terms of ion conductivity or energy density. Meanwhile, according to an embodiment of the present disclosure, the porous substrate may have a porosity of 20-70% and may be controlled to a range of 30-50% preferably. According to an embodiment of the present disclosure, the pores may have a mean pore size of 10 μm or less and a tensile strength of 50-300 $gf/cm^2$.

Meanwhile, according to the present disclosure, the porosity and pore size may be determined by using BEL-SORP (BET apparatus) available from BEL Japan Co. using an adsorption gas such as nitrogen, or through a method, such as mercury intrusion porosimetry or capillary flow porosimetry. In a variant, according to another embodiment of the present disclosure, the thickness and weight of the resultant coating layer may be measured to calculate porosity from the theoretical density of the coating layer.

Each of the first electrolyte layer and the second electrolyte layer comprises an ion conductive electrolyte material, and the solid electrolyte material has an ion conductivity of about $1 \times 10^{-7}$ S/cm or more, preferably about $1 \times 10^{-5}$ S/cm or more. According to an embodiment of the present disclosure, the electrolyte material comprises a polymeric solid electrolyte material, and the polymeric solid electrolyte material is a polymer electrolyte formed by adding a polymer resin to a solvated lithium salt.

According to an embodiment of the present disclosure, the polymer resin is a thermoplastic material and has a molecular weight (Mw) of about 100,000-600,000. As described hereinafter, the solid electrolyte membrane according to the present disclosure is obtained by forming a polymer electrolyte into a film shape and pressing the polymer electrolyte film into the porous sheet. When the above-defined conditions are satisfied, it is possible to carry out a press fitting process with ease. According to an embodiment of the present disclosure, the polymer resin is one satisfying the above-defined conditions. Particular examples of the polymer resin may comprise at least one of polyether polymer, polycarbonate polymer, acrylate polymer, polysiloxane polymer, phosphazene polymer, polyethylene derivative, alkylene oxide derivative, such as polyethylene oxide, phosphate polymer, polyagitation lysine, polyester sulfide, polyvinyl alcohol, polyvinylidene fluoride, polymer containing an ionically dissociable group, or the like. In addition, the solid polymer electrolyte may comprise, as a polymer resin, at least one of a branched copolymer comprising polyethylene oxide (PEO) backbone copolymerized with a comonomer comprising an amorphous polymer, such as PMMA, polycarbonate, polysiloxane (pdms) and/or phosphazene, comb-like polymer, crosslinked polymer resin, or the like.

According to the present disclosure, 'molecular weight (Mw)' means weight average molecular weight. According to an embodiment of the present disclosure, molecular weight (Mw) may be determined by using gel permeation chromatography (GPC). For example, 200 mg of a polymer resin whose molecular weight is to be determined is diluted with 200 mL of a solvent, such as tetrahydrofuran (THF) to prepare about 1000 ppm of sample, and then molecular weight of the polymer resin may be determined by using Agilent 1200 series GPC instrument at a flow rate of 1 mL/min through an RI (refractive index) detector.

In the electrolyte according to the present disclosure, the lithium salt is an ionizable lithium salt and may be represented by $Li^+X^-$. The anion ($X^-$) of the lithium salt is not particularly limited, but may comprise $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

According to an embodiment of the present disclosure, the first electrolyte layer and the second electrolyte layer may be the same or different from each other in terms of physical properties, such as ingredients, ion conductivity, or the like.

According to an embodiment of the present disclosure, the solid electrolyte membrane may be obtained by forming an electrolyte film, which is a film-type solid electrolyte material, by using a polymeric electrolyte material, disposing two sheets of the resultant electrolyte films individually on one surface and the other surface of the porous substrate, and carrying out pressurization so that the electrolytes film may be pressed into the porous substrate and the pores of the porous substrate may be filled with the electrolyte films.

Hereinafter, the method for manufacturing an electrolyte membrane according to the present disclosure will be explained in more detail with reference to FIG. 1a and FIG. 1b.

First, an electrolyte film is prepared. The electrolyte film is a solid electrolyte material formed into a film shape and may be prepared as follows. A polymer electrolyte is mixed with a solvent to prepare slurry for forming an electrolyte film. The solvent may be selected suitably depending on the polymer electrolyte to be used. For example, when an alkylene oxide-based electrolyte, such as polyethylene oxide (PEO), is used as a polymer resin, acetonitrile may be used as a solvent. According to an embodiment of the present disclosure, the slurry may have a solid content of about 5-15 wt %. Herein, it is possible to accelerate homogeneous mixing of the polymer electrolyte with the solvent by increasing the temperature of slurry to 40-60° C.

Next, the slurry is applied to a release sheet, such as a polyethylene terephthalate film, and is formed into a film shape having a predetermined thickness. The application and shape forming may be carried out by a known coating process, such as doctor blade coating. Then, the slurry is dried to remove the solvent and to obtain an electrolyte film. According to an embodiment of the present disclosure, the electrolyte films may comprise the same solid electrolyte material or different solid electrolyte materials. In addition, the electrolyte films may be obtained by using the same material under the same processing conditions.

Then, the resultant electrolyte films are disposed on both surfaces of the porous substrate, and each of the first protective layer and the second protective layer is further disposed on each surface of the electrolyte film to prepare a laminate structure. In other words, the laminate structure comprises the first protective layer, the first electrolyte film, the porous substrate, the second electrolyte film and the second protective layer, stacked successively. After that, one surface or both surfaces of the laminate structure are pressurized so that the first and the second electrolyte films may be pressed into the porous substrate. According to an embodiment of the present disclosure, the first electrolyte film and the second electrolyte film may have the same thickness.

Meanwhile, according to an embodiment of the present disclosure, when preparing the laminate structure, the solid electrolyte film may be disposed locally at a specific portion of the nonwoven web substrate. As described hereinafter, pressure is applied to the laminate structure to carry out pressurization so that the electrolyte films may be pressed into the porous sheet. For example, the pressurization may be carried out by a roll press process using a roll press system provided with a pair of pressurization rollers. When the pressurization is carried out by using a roll press process as mentioned above, the electrolyte films may be disposed locally at a portion of the laminate structure which is introduced to the pressurization rollers first. When the electrolyte films are disposed in this manner, the electrolyte films are oriented and spread in the direction opposite to the running direction of the laminate structure via the pressurization by the rolls during the roll press process, while the electrolyte films are pressed into and packed in the porous sheet. FIG. 1a is a schematic view illustrating electrolyte films disposed locally in one direction of the laminate structure.

In addition, release films, such as polyethylene terephthalate films, may be disposed on both surfaces of the laminate structure in order to protect the surfaces of the laminate structure and to prevent contamination of the surface of the pressurization member with the electrolyte material. Particularly, the release films can function to protect the first protective layer and the second protective layer from being damaged by strong linear pressure applied by the roll press, when the pressurization is carried out through a roll press process.

According to the present disclosure, the first protective layer, the second protective layer and the release film are removed from the solid electrolyte membrane after the pressurization, and thus are not comprised in the structure of the solid electrolyte membrane.

According to an embodiment of the present disclosure, the first protective layer and the second protective layer preferably use the same material as the porous substrate. For example, the first protective layer and the second protective layer may be obtained by using the same material as the porous substrate in terms of ingredients and contents under the same processing conditions. In a variant, the porous substrate, the first protective layer and the second protective layer may be obtained from a single porous polymer sheet. According to an embodiment of the present disclosure, the porous substrate, the first protective layer and the second protective layer preferably have the same contact angle. When they have the same contact angle as mentioned above, the solid electrolyte membrane has the same affinity with each of the porous substrate, the first protective layer and the second protective layer, and thus it is possible to apply pressure uniformly toward the porous substrate during the pressurization step as described hereinafter. According to an embodiment of the present disclosure, the contact angle is the water drop contact angle and means the angle formed between a water drop and each of the surfaces of the porous substrate, the first protective layer and the second protective layer, when the water drop is in a thermodynamic equilibrium state with each surface. In other words, the contact angle is measured from the contact point between the end point of water drop curve and the solid (i.e. the porous substrate, the first protective layer and the second protective layer) surface at the liquid-solid-gas junction point.

When using the release film alone without addition of the first protective layer and the second protective layer, or when the first protective layer and the second protective layer are not the same material as the porous substrate, affinity of the electrolyte layer to the porous substrate is not the same as affinity of the electrolyte layer to the release film and/or the first and the second protective layers. Thus, the electrolyte layer is not pressed into the porous substrate but is attached to the release film or the first and the second protective layers undesirably. Thus, the inventors of the present disclosure have focused on the above-mentioned problem. To solve the problem, the same material as the porous substrate is disposed on the surface of the electrolyte layer to impart the same affinity to both surfaces of each electrolyte layer. As described hereinafter, it can be seen that the first electrolyte layer and the second electrolyte layer are pressed into the porous substrate disposed at the central portion uniformly over the whole surface thereof with high efficiency, in the method for manufacturing a solid electrolyte membrane according to an embodiment of the present disclosure.

Although pressurization using a roll press system is exemplified hereinabove, the pressurization may be carried out by using a conventional pressurization member, such as a roll press, hot press, uniaxial press or a jig. Herein, it is possible to provide the electrolyte membrane with a suitable thickness and/or porosity by controlling the processing conditions, such as an interval of rollers or jigs, applied pressure and temperature.

According to an embodiment of the present disclosure, the pressurization may be carried out by using a suitable pressurization member selected from known pressurization members, such as a hot press, roll press and a jig. Herein, the pressurization member may be further provided with a separate heating member so that the surface of the member facing the electrolyte film may be heated. Since the electrolyte film is heated by the pressurization member and thus has increased ductility, it may be pressed into the sheet with ease even under a low-pressure condition.

According to an embodiment of the present disclosure, the pressurization is carried out preferably by using a roll press. The roll press processing conditions may be controlled suitably considering the solid electrolyte material to be used, ingredients forming the porous substrate, or the like. For example, the roll press process may be carried out, while applying heat so that the laminate structure may reach to about 60-150° C. In addition, the roller rotation speed may be controlled in a range of about 0.2-2 m/min. Meanwhile, the interval between rollers upon the first introduction of the laminate structure to a roll press for the first time is preferably about A+20 µm or more, when the total thickness of the laminate structure is taken as A µm. The roll press process may be repeated many times, while the roller interval is reduced. When repeating the roll press process, it is preferred to reduce the roller interval gradually as shown in FIG. 1b (31a, 31b, 31c and 32a, 32b, 32c). For example, the roller interval may be reduced by about 7-12 µm from the roller interval upon the previous pressurization. The roll press process may be carried out repeatedly in a suitable number within a range of 5-15 times. FIG. 1b is a schematic view illustrating such a multi-step roll press process.

Meanwhile, according to an embodiment of the present disclosure, the electrolyte layer may be warmed to 60-150° C. to accelerate introduction of the material into the pores of the porous substrate by increasing the ductility of the material before it is introduced to the press fitting process after the preparation thereof. Such a warming method is not limited to a specific method. However, the electrolyte layer may be warmed by allowing it to stand in an oven heated to a predetermined temperature for several hours.

According to an embodiment of the present disclosure, the porous substrate may be subjected to surface-modification in order to increase the hydrophilicity or hydrophobicity of the surface, before it is introduced to a press fitting process. For example, when polyethylene oxide (PEO) is used as a polymer film, the porous substrate may be surface-modified with hydrophilicity to increase the affinity with PEO. It is possible to accelerate press fitting of the electrolyte film into the porous substrate and to increase adhesion between the electrolyte layer and the porous substrate by increasing the affinity with the electrolyte material. The hydrophilic surface-modification method is not limited to a specific method. For example, the surface-modification method may be selected suitably from known methods, such as UV irradiation, plasma treatment, acid treatment and ozone treatment.

Meanwhile, the solid electrolyte membrane obtained after the press fitting is cut into a suitable size so that it may be applied to a battery. In addition, the edge portion of the solid electrolyte membrane may remain in a state not filled with the solid electrolyte material sufficiently during the press fitting. Therefore, such an insufficiently filled portion may be removed in the cutting step.

In addition, the present disclosure relates to an all-solid-state battery comprising the above-described solid electrolyte membrane. The all-solid-state battery comprises a positive electrode, a negative electrode and a solid electrolyte membrane. According to an embodiment of the present disclosure, the solid electrolyte membrane is obtained by the above-described method and comprises a porous substrate therein, wherein the pores of the porous substrate are filled with the solid electrolyte material.

According to the present disclosure, each of the positive electrode and the negative electrode may comprise a current collector and an electrode active material layer formed on at least one surface of the current collector, wherein the electrode active material layer may comprise a plurality of electrode active material particles and a solid electrolyte. In addition, the electrode active material layer may further comprise at least one of a conductive material and a binder resin, if necessary. Additionally, the electrode active material layer may further comprise various additives in order to supplement or improve the physicochemical properties of the electrode.

According to the present disclosure, in the case of a negative electrode, the electrode active material may be any material used conventionally as a negative electrode active material for a lithium ion secondary battery. For example, the negative electrode active material may comprise at least one selected from: carbon such as non-graphitizable carbon, graphitic carbon, or the like; metal composite oxides such as $Li_xFe_2O_3$ ($0<x\leq1$), $Li_xWO_2$ ($0<x\leq1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0<x\leq1$; $1\leq y\leq3$; $1\leq z\leq8$); lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like. According to an embodiment of the present disclosure, the negative electrode active material may comprise a carbonaceous material and/or Si.

In the case of a positive electrode, the electrode active material may be any material used conventionally as a positive electrode active material for a lithium ion secondary battery. For example, the positive electrode active material may comprise, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to the present disclosure, the current collector comprises a metal plate having electrical conductivity and may be one selected suitably depending on polarity of electrodes known in the field of secondary batteries.

According to the present disclosure, the conductive material is added generally in an amount of 1-30 wt % based on the total weight of the mixture comprising the electrode active material. The conductive material is not particularly limited, as long as it causes no chemical change in the corresponding battery and has conductivity. For example, the conductive material comprise any one selected from: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding of the electrode active material with the conductive material, and binding to the current collector. Particular examples of the binder resin comprise polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like. In general, the binder resin may be used in an amount of 1-30 wt %, or 1-10 wt %, based on 100 wt % of electrode active material layer.

Meanwhile, according to the present disclosure, the electrode active material layer may comprise at least one additive, such as an oxidation stabilizing additive, reduction stabilizing additive, flame retardant, heat stabilizer, anti-fogging agent, or the like, if necessary According to the present disclosure, the solid electrolyte may further comprise at least one of a polymeric solid electrolyte, oxide-based solid electrolyte and a sulfide-based solid electrolyte.

According to the present disclosure, different solid electrolytes may be used for the positive electrode, negative electrode and the solid electrolyte membrane. In a variant, the same solid electrolyte may be used for at least two battery elements. For example, in the case of a positive electrode, a polymeric solid electrolyte having excellent oxidation stability may be used as a solid electrolyte. In addition, in the case of a negative electrode, a polymeric solid electrolyte having excellent reduction stability is used preferably as a solid electrolyte. However, the scope of the present disclosure is not limited thereto. Since the solid electrolyte mainly functions to transport lithium ions in the electrode, any material having a high ion conductivity, such as $10^{-7}$ s/cm or more, $10^{-5}$ s/cm or more, may be used with no particular limitation.

According to the present disclosure, the polymeric solid electrolyte may be a polymeric solid electrolyte formed by adding a polymer resin to a lithium salt, wherein the polymer resin and lithium salt are solvated independently from each other. In a variant, the polymeric solid electrolyte may be a polymer gel electrolyte formed by impregnating a polymer resin with an organic electrolyte solution containing an organic solvent and a lithium salt.

According to the present disclosure, the polymeric solid electrolyte may be the same as described above with reference to the solid electrolyte membrane.

The sulfide-based solid electrolyte contains sulfur (S), has ion conductivity of metals that belong to Group 1 or Group 2 in the Periodic Table, and may comprise Li—P—S glass or Li—P—S glass ceramic. Non-limiting examples of the sulfide-based solid electrolyte comprise at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_{2S5}$, $Li_2S$—$P_2S_5$—$P_{2O5}$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, or the like.

In addition, the oxide-based solid electrolyte contains oxygen (O), has ion conductivity of metals that belong to Group 1 or Group 2 in the Periodic Table. Non-limiting examples of the oxide-based solid electrolyte comprise at least one of LLTO compounds, $Li_6La_2CaTa_2O_{12}$, $Li_6La_2ANb_2O_{12}$ (wherein A is Ca or Sr), $Li_2Nd_3TeSbOi_2$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein 0≤x≤1, 0≤y≤1), $LiAl_xZr_{2-x}(PO_4)_3$ (wherein 0≤x≤1, 0≤y≤1), $LiTi_xZr_{2-x}(PO_4)_3$ (wherein 0≤x≤1, 0≤y≤1), LISICON compounds, UPON compounds, perovskite compounds, NASICON compounds and LLZO compounds.

Further, the present disclosure provides a secondary battery comprising the above-described solid electrolyte membrane. The present disclosure also provides a battery module comprising the secondary battery as a unit cell, a battery pack comprising the battery module, and a device comprising the battery pack as a power source. Herein, particular examples of the device may comprise, but are not limited to: power tools driven by an electric motor; electric cars, comprising electric vehicles (EV), hybrid electric vehicles (HEV), plug-in hybrid electric vehicles (PHEV), or the like; electric carts, comprising electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

1. Manufacture of Solid Electrolyte Membrane

Examples 1-4

Polyethylene oxide (molecular weight (Mw): 1,000,000) was prepared and mixed with LiTFSI to obtain a polymeric electrolyte. In the polymeric electrolyte, PEO and LiTFSI were prepared at a molar ratio of [EO:Li$^+$]=9:1. The polymeric electrolyte and acetonitrile were agitated at 60° C. overnight to prepare a polymer solution having a concentration of about 10 wt %. Next, the polymer solution was applied to a polyethylene terephthalate release film at room temperature by using a doctor blade and dried naturally at room temperature to obtain an electrolyte film having a thickness of about 100 μm. Two sheets of such electrolyte films were prepared.

Then, three sheets of nonwoven web substrates (porosity 48%, mean pore size 10 μm, tensile strength 900 gf/cm$^2$, thickness 13 μm, made of polyethylene terephthalate) were prepared, and the nonwoven substrate (first protective layer)/electrolyte film/nonwoven web substrate/electrolyte film/nonwoven web substrate (second protective layer) were stacked successively to prepare a laminate structure. Herein, each electrolyte film was disposed so that it might be localized at the lateral end portion to which roll pressing was applied for the first time in the surface of the nonwoven web substrate. Then, polyethylene terephthalate release films (thickness 50 μm) were disposed on both surfaces of the laminate structure. The laminate structure was introduced to a roll press to press the electrolyte films into the nonwoven web interposed therebetween, thereby providing an electrolyte membrane having a thickness of about 50 μm. Each of the roll press processes according to Examples 1-4 was carried out under the temperature condition and roll press speed condition as shown in the following Table 1. Herein, the interval between rolls was reduced by 10 μm from the thickness of the laminate structure+20 μm and roll pressing was carried out through multiple steps in the number of repetition as shown in Table 1. After carrying out the pressurization, the first and the second protective layers were removed. The porosity and ion conductivity of each of the resultant electrolyte membranes are shown in the following Table 2.

TABLE 1

| | Heating temperature (° C.) | Roll press repetition (times) | Roll press speed (M/min) | Area of solid electrolyte membrane (cm × cm) |
|---|---|---|---|---|
| Example 1 | 80 | 10 | 0.5 | 8 × 10 |
| Example 2 | 80 | 10 | 1 | 8 × 8 |
| Example 3 | 60 | 10 | 0.5 | 8 × 8 |
| Example 4 | 80 | 15 | 0.5 | 10 × 10 |

TABLE 2

| | Ion conductivity (S/cm) | Porosity (%) |
|---|---|---|
| Example 1 | 9 × 10$^{-5}$ | 4 |
| Example 2 | 9 × 10$^{-5}$ | 4 |

TABLE 2-continued

| | Ion conductivity (S/cm) | Porosity (%) |
|---|---|---|
| Example 3 | 9 × 10$^{-5}$ | 3.5 |
| Example 4 | 8 × 10$^{-5}$ | 5 |

Comparative Example 1

Powder type polymer (poly(ethylene oxide), PEO, Mw=600,000 g/mol) and lithium salt (LiTFSI) were introduced to and mixed in a solvent (acetonitrile) to prepare a polymer solution. Herein, the polymer solution had a solid content of 50% and PEO and LiTFSI were used at a molar ratio of [EO:Li$^+$]=14:1.

Next, the nonwoven web used in Example 1 was fixed smoothly and the polymer solution was poured onto the substrate and applied uniformly thereto by using a doctor blade. The resultant product was vacuum-dried at 60° C. to obtain a separator. The resultant separator had a thickness of 100 μm.

Figure 5:
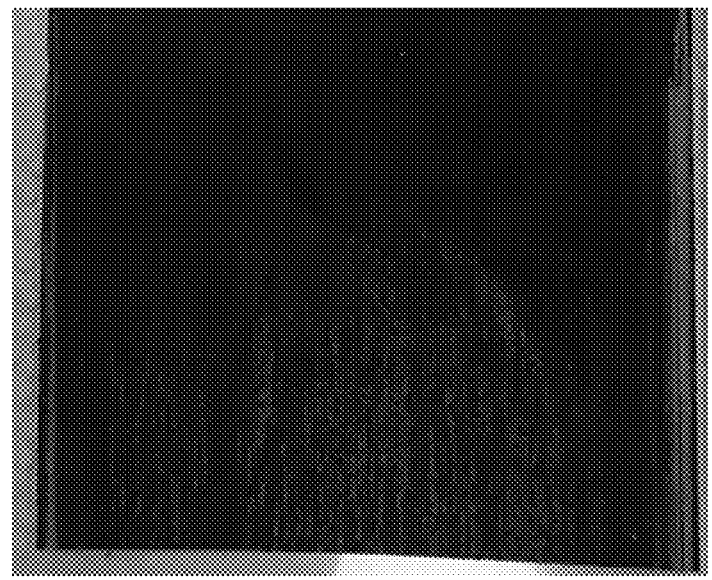
FIG. 5 is a photographic image of the solid electrolyte membrane obtained according to Comparative Example 1.

FIG. 5 is a photographic image of the solid electrolyte membrane according to Comparative Example 1. It can be seen that the non-filled portion, which is not filled with the solid electrolyte, is shown relatively brightly. The resultant solid electrolyte membrane had a porosity of about 18% and an ion conductivity of 5×10$^{-5}$ S/cm. The solid electrolyte membrane according to Comparative Example 1 has a large amount of pores remaining after drying the solvent, and the solid content is not pressed into the substrate sufficiently. Thus, it is difficult to obtain a high-density electrolyte membrane.

Comparative Example 2

An electrolyte film was obtained in the same manner as Example 1. Next, the electrolyte film was stacked merely on one surface of the same nonwoven web as used in Example 1 to obtain a laminate structure. Then, both surfaces of the laminate structure were covered with release films and roll pressing was carried out under the same conditions as Example to obtain an electrolyte membrane.

Figure 2:
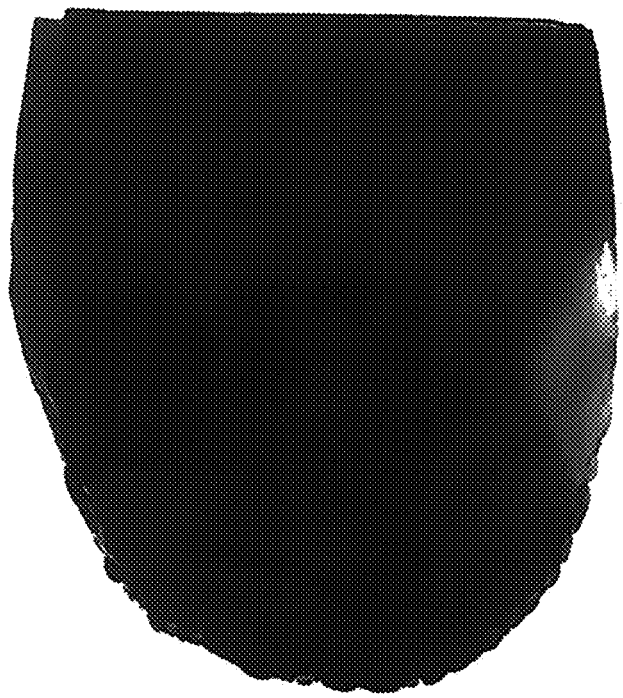
FIG. 2 shows an image of the solid electrolyte membrane obtained by the method according to Example 1.
Figure 6:
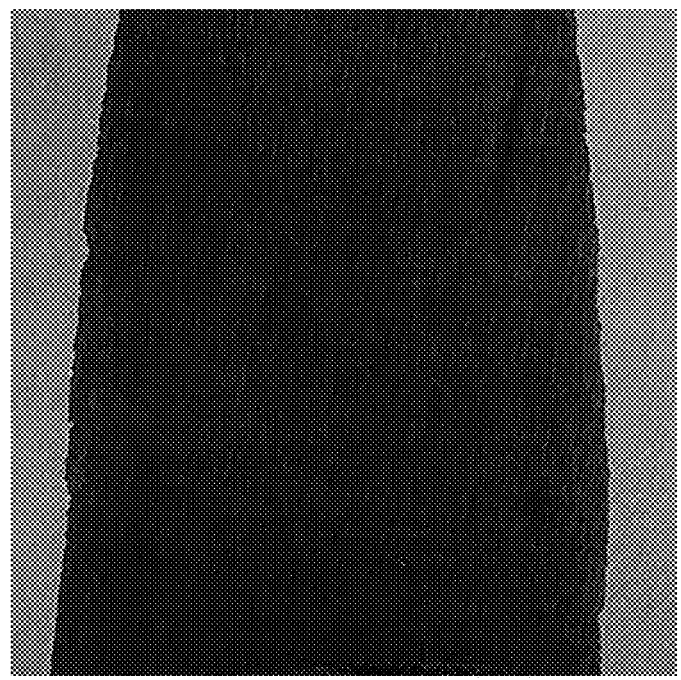
FIG. 6 is a photographic image of the solid electrolyte membrane obtained according to Comparative Example 2.

In the case of the solid electrolyte membrane according to Comparative Example 2, the electrolyte film was sufficiently pressed into one surface of the nonwoven web on which the electrolyte film was stacked. However, the electrolyte film was not insufficiently pressed into the other surface as determined from pinholes and pores observed on the other surface (FIG. 6). Thus, different amounts of electrolyte were packed in both surfaces of the electrolyte membrane, and the insufficiently packed surface shows high resistance at the interface with an electrode. When comparing FIG. 2 with FIG. 6, the color of the nonwoven web itself, i.t. white color, is shown on the surface of the solid electrolyte membrane in the case of FIG. 6, while a dark black color (color of the solid electrolyte) is shown uniformly over the whole surface of the solid electrolyte membrane by virtue of uniform packing of the electrolyte material in the case of FIG. 2. The resultant solid electrolyte membrane had a porosity of about 11% and an ion conductivity of 6×10$^{-5}$ S/cm.

Comparative Examples 3-1 to 3-4

Laminate structures were obtained in the same manner as Example 1. Release films were disposed on both surfaces of each laminate structure and the electrolyte film was pressed into and packed in the nonwoven web by using a hot press process. The hot press process was carried out under the conditions as shown in the following Table 3. The resultant solid electrolyte membranes had a porosity of about 8% and an ion conductivity of $5 \times 10^{-5}$ S/cm. However, it was difficult to manufacture an electrolyte membrane having an area of 4.5 cm×4.5 cm or more through the hot press process. Thus, the hot press processes in these Comparative Examples are not preferred as processes for manufacturing a large area thin film-type solid electrolyte membrane.

TABLE 3

|  | Processing conditions | | | Size of resultant samples (cm × cm) |
| --- | --- | --- | --- | --- |
|  | Temperature (° C.) | Pressure (MPa) | Pressurization time (hr) | |
| Comp. Ex. 3-1 | 80 | 200 | 1 | 4 × 4 |
| Comp. Ex. 3-2 | 100 | 200 | 1 | 4.5 × 4.5 |
| Comp. Ex. 3-3 | 80 | 200 | 1 | 4.5 × 4.5 |
| Comp. Ex. 3-4 | 80 | 200 | 5 | 4 × 4 |

Comparative Example 4

Figure 3:
FIG. 3 and FIG. 4 show images of the solid electrolyte membrane obtained by the method according to Comparative Example 4.
Figure 4:
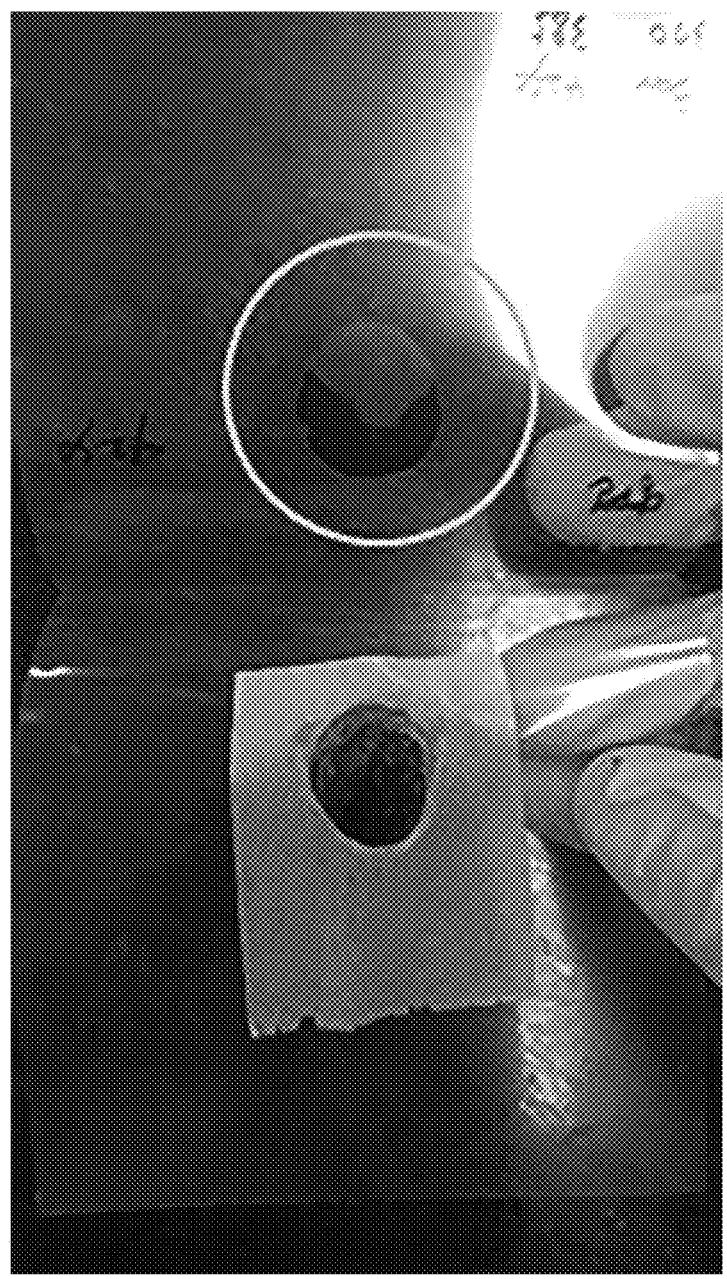

Two sheets of solid electrolyte films were obtained in the same manner as Example 1. A nonwoven web was prepared and each solid electrolyte film was disposed on each of both surfaces of the nonwoven web to prepare a laminate structure. Then, release films were disposed on both surfaces of the laminate structure. The laminate structure was subjected to a roll press process in the same manner as Example 1 to obtain an electrolyte membrane. FIG. 3 and FIG. 4 are photographic images of the solid electrolyte membrane according to Comparative Example 4. Referring to FIG. 3 and FIG. 4, in the case of Comparative Example 4, the electrolyte film and the release film are adhered to each other, and thus the electrolyte film was not pressed into the nonwoven web substrate sufficiently.

2. Determination of Ion Conductivity

Each of the solid electrolyte membranes according to Examples and Comparative Examples was cut into a size of 1.7671 cm². Then, the solid electrolyte membrane was interposed between two sheets of stainless steel (SUS) to obtain a coin cell. The electrochemical impedance of the coin cell was determined by using an impedance analyzer (VMP3, Bio logic science instrument) at 60° C. under the conditions of an amplitude of 10 mV and a scan range from 500 kHz to 0.1 mHz.

3. Determination of Porosity

Each of the solid electrolyte membranes according to Examples and Comparative Examples was cut into a size of 1.7671 cm², and the weight and volume of each solid electrolyte membrane were measured (apparent density was determined), and the apparent density was compared with a designed value (true density) to calculate porosity. In other words, the true density of each solid electrolyte membrane was calculated from the compositional ratio of the ingredients contained in each solid electrolyte membrane and the density of each ingredient, and then porosity was calculated from the difference between the apparent density and the true density.

4. Determination of Charge/Discharge Profile of Battery

First, NCM811 ($LiNi_{0.8}Co_{0.1}Mn_{0.1}O_2$) as a positive electrode active material, vapor grown carbon fibers (VGCF) as a conductive material, and a polymeric solid electrolyte (mixture of PEO with LiTFSI ($CF_3SO_2NLi$ $LiSO_2CF_3$), molar ratio of EO:Li$^+$=9:1) were mixed at a weight ratio of 80:3:17, and the resultant mixture was introduced to acetonitrile, followed by agitation, to provide electrode slurry. An aluminum current collector having a thickness of 20 μm was prepared. The electrode slurry was applied to the current collector by a blade and the resultant product was vacuum-dried at 120° C. for 4 hours. Then, pressing was carried out by using a roll press to obtain an electrode (positive electrode) having an electrode loading amount 3 mAh/cm², an electrode active material layer thickness of 86 μm and a porosity of 16%. Then, the electrode was cut into a circular shape having an area of 1.4875 cm². In addition, a negative electrode cut into a circular shape having an area of 1.7671 cm² was prepared. The negative electrode comprises lithium metal having a thickness of 40 μm, bound to the surface of a current collector made of copper and having a thickness of 10 μm. Each of the solid electrolyte membrane obtained from Examples 1-4 and Comparative Examples 1 and 2 was cut into a size of 1.7671 cm² and interposed between the positive electrode and the negative electrode to obtain a battery. The battery was subjected to charge/discharge at about 60° C. to evaluate the initial discharge capacity.

Charge condition: constant current (CC)/constant voltage (CV), (4.25V, 0.005C current cut-off)
Discharge condition: constant current (CC) 3V Table 4 shows the discharge capacity of each of the batteries comprising the solid electrolyte membranes according to Examples 1-4. It can be seen that Examples 1-4 show a high discharge capacity of 200 mAh/g or more.

TABLE 4

|  | Discharge capacity (mAh/g) |
| --- | --- |
| Example 1 | 210 |
| Example 2 | 208 |
| Example 3 | 208 |
| Example 4 | 205 |

Figure 7:
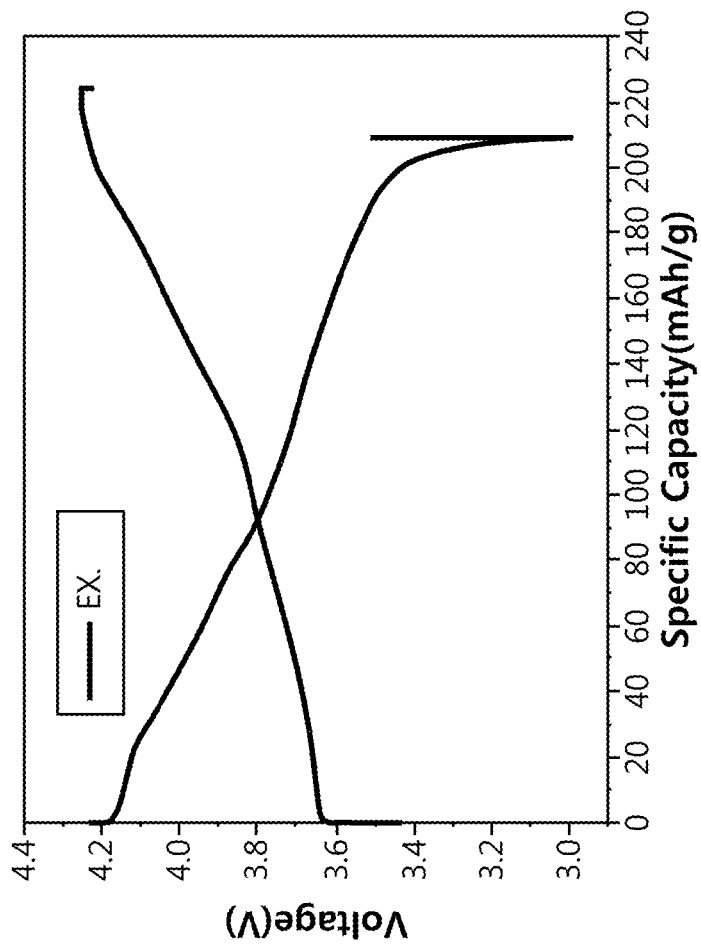
FIG. 7 illustrates the charge/discharge profile of the battery according to Example 1.
Figure 8:
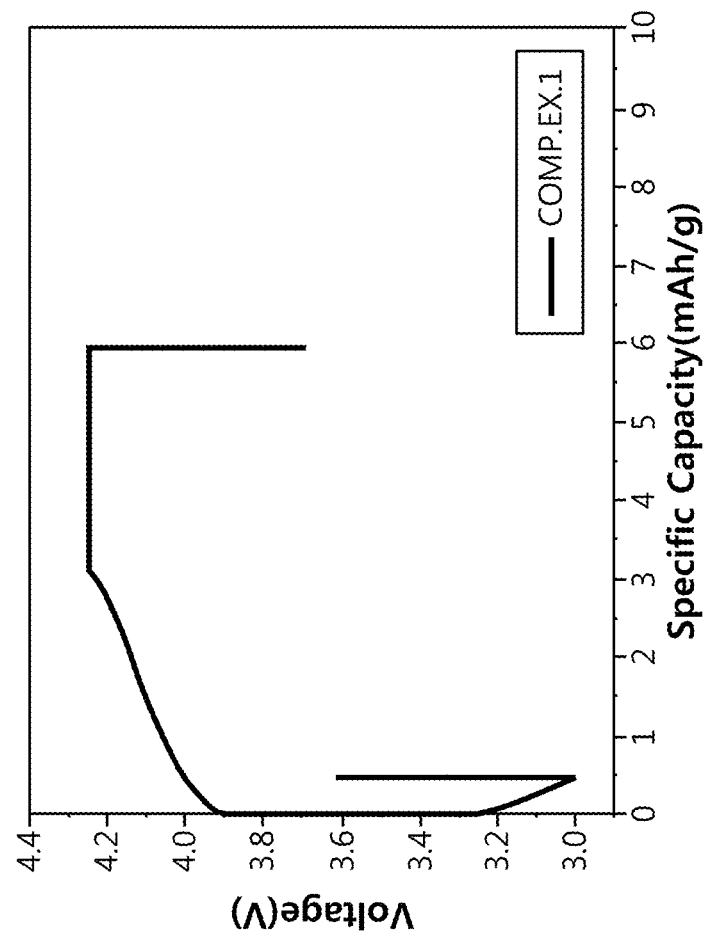
FIG. 8 and FIG. 9 illustrate the charge/discharge profiles of the batteries according to Comparative Example 1 and Comparative Example 2, respectively.
Figure 9:
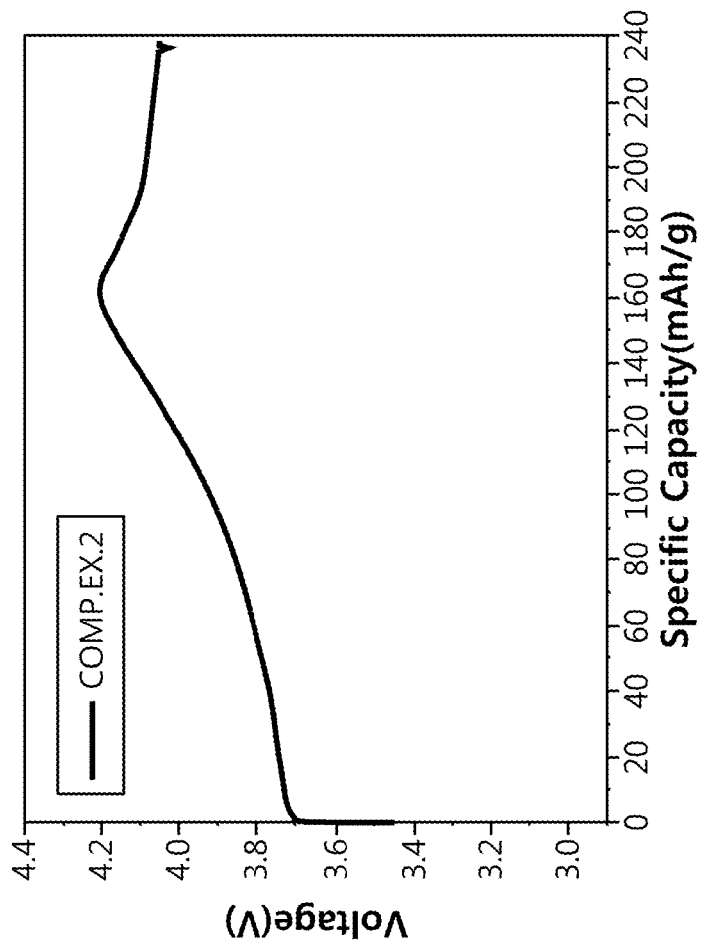

FIG. 7 shows the charge/discharge profile of Example 1. It can be seen that Example 1 shows a good charge/discharge profile and allows operation of a battery. Meanwhile, FIG. 8 and FIG. 9 show the charge/discharge profile of Comparative Example 1 and that of Comparative Example 2, respectively. It can be seen that the batteries using the solid electrolyte membranes according to Comparative Examples 1 and 2 cause an increase in over-voltage due to an increase in interfacial resistance in the initial charge profile, and thus cannot work normally.

DESCRIPTION OF DRAWING NUMERALS

10: Laminate structure
11: First protective layer, second protective layer and porous substrate
12: Electrolyte film
20: Release film
31, 32: Pressurization rollers
100: Solid electrolyte membrane

What is claimed is:

1. A method for manufacturing a solid electrolyte membrane for an all-solid-state battery, comprising the steps of:
   stacking a first protective layer, a first film-type solid electrolyte material, a porous substrate, a second film-type solid electrolyte material and a second protective layer successively to prepare a laminate structure;
   carrying out pressurization of the laminate structure so that the first and the second solid electrolyte materials are pressed into the porous substrate and pores of the porous substrate are filled with the first film-type solid electrolyte material and the second film-type solid electrolyte material;
   removing the first protective layer and the second protective layer,
   wherein the pressurization is carried out by a roll-press process,
   wherein a first release film and a second release film is further disposed on each of both surfaces of the laminate structure before the pressurization, and the first protective layer, the second protective layer and the first release film and the second release film are removed after the pressurization, and
   wherein the first protective layer and the second protective layer are the same composition as the porous substrate.

2. The method for manufacturing a solid electrolyte membrane for an all-solid-state battery according to claim 1, wherein the first film-type solid electrolyte material or the second film-type solid electrolyte material comprises a polymer resin mixed with a lithium salt and shows an ion conductivity of $1 \times 10^{-7}$ S/cm or more.

3. The method for manufacturing a solid electrolyte membrane for an all-solid-state battery according to claim 1, wherein the first protective layer and the second protective layer are obtained by using the same materials as the porous substrate in terms of ingredients and contents under the same processing conditions.

4. The method for manufacturing a solid electrolyte membrane for an all-solid-state battery according to claim 3, wherein the porous substrate, the first protective layer and the second protective layer have the same contact angle.

5. The method for manufacturing a solid electrolyte membrane for an all-solid-state battery according to claim 1, wherein the porous substrate is a polymer film or nonwoven web having a plurality of pores.

6. The method for manufacturing a solid electrolyte membrane for an all-solid-state battery according to claim 2, wherein the polymer resin is selected from the group consisting of a polyether polymer, polycarbonate polymer, acrylate polymer, polysiloxane polymer, phosphazene polymer, polyethylene derivative, alkylene oxide derivative, polyethylene oxide, phosphate polymer, polyagitation lysine, polyester sulfide, polyvinyl alcohol and polyvinylidene fluoride, and mixtures thereof.

7. The method for manufacturing a solid electrolyte membrane for an all-solid-state battery according to claim 1, wherein the first film-type solid electrolyte material and the second film-type solid electrolyte material are prepared by using the same materials under the same processing conditions.

8. The method for manufacturing a solid electrolyte membrane for an all-solid-state battery according to claim 7, wherein the first film-type solid electrolyte material and the second film-type solid electrolyte material have the same thickness.

9. The method for manufacturing a solid electrolyte membrane for an all-solid-state battery according to claim 1, wherein the first film-type solid electrolyte material and the second film-type solid electrolyte material are pressed into the porous substrate by carrying out pressurization of the laminate structure, and the pressurization is carried out by using a roll press.

10. The method for manufacturing a solid electrolyte membrane for an all-solid-state battery according to claim 1, wherein at least one of the first film-type solid electrolyte material and the second film-type solid electrolyte material is prepared by disposing at least one of the first film-type solid electrolyte material and the second film-type solid electrolyte material locally at a specific portion of the porous substrate surface before the pressurization.

11. The method for manufacturing a solid electrolyte membrane for an all-solid-state battery according to claim 1, wherein the pressurization is carried out under heating.

* * * * *